Oct. 21, 1941.   R. L. H. SMITH   2,259,840
HARDNESS TESTING MACHINE
Filed July 1, 1939   2 Sheets-Sheet 1
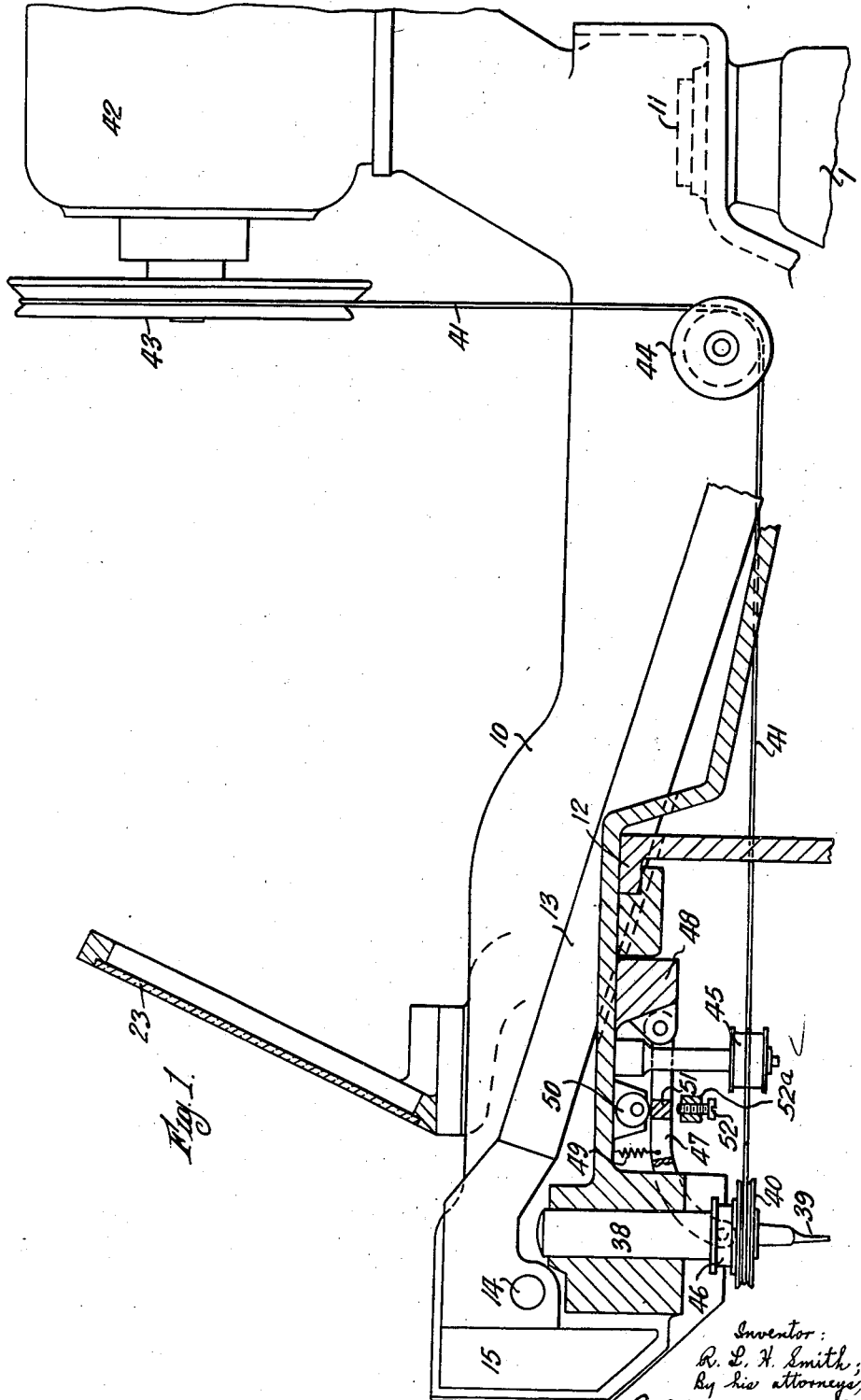

Oct. 21, 1941.                R. L. H. SMITH                2,259,840
                          HARDNESS TESTING MACHINE
                          Filed July 1, 1939          2 Sheets—Sheet 2
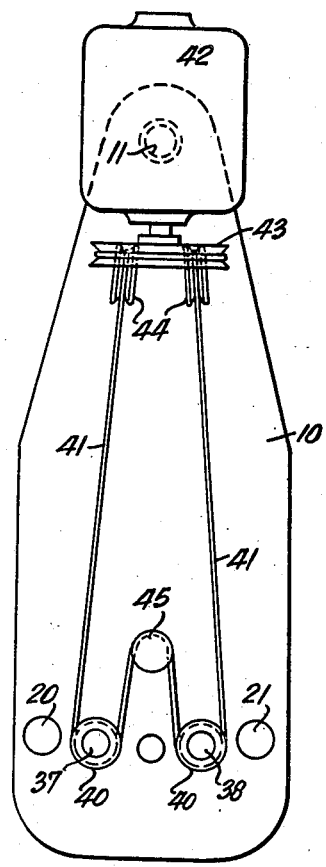
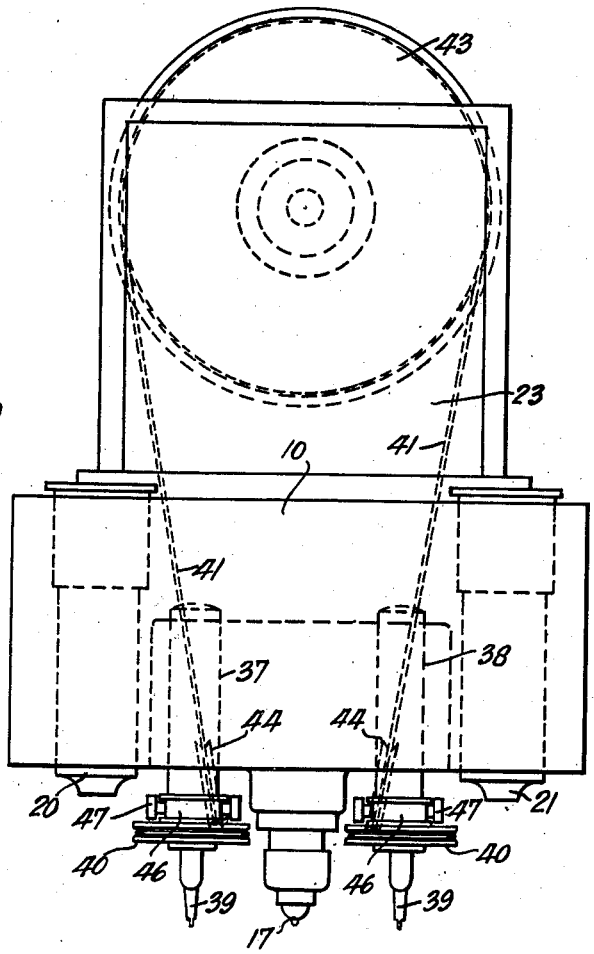
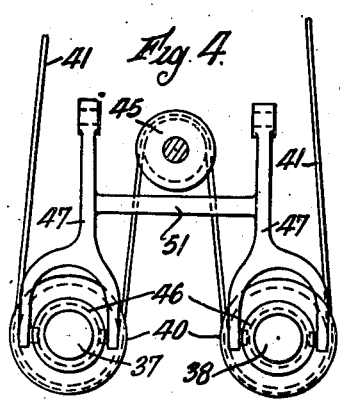
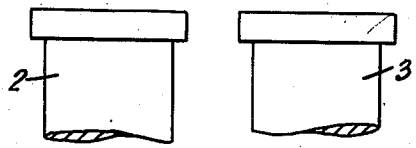
Inventor:
R. L. H. Smith;
By his attorneys,
Baldwin & Wight Patented Oct. 21, 1941

2,259,840

UNITED STATES PATENT OFFICE 2,259,840

HARDNESS TESTING MACHINE

Robert Low Heron Smith, Hove, England

Application July 1, 1939, Serial No. 282,559
In Great Britain July 6, 1938

7 Claims. (Cl. 265—12)

The invention relates to hardness testing machines of the kind in which a hard object termed an indentor is pressed under predetermined conditions into a surface of the test specimen, the dimensions of the impression constituting a measure of the hardness.

Such machines are very often required to test the hardness of plates, bars or other pieces of material having a black or rough finish, and sometimes having a curved surface. It is then necessary to prepare a small flat surface of clean metal to receive the impression from the indentor. This preparation has usually been carried out by hand with a file, involving an extra setting up. Where a large series of tests has to be carried out, a separate operator may be required in addition to the usual testing staff.

According to the invention a hardness testing machine of the kind referred to is provided with means such as a grinder or milling cutter for preparing a surface for the impression. The test specimen is then placed in the machine in a suitable position, the grinder or milling cutter is brought down on to the specimen and prepares a flat surface, after which it is swung or slid out of the way so that the indentor may be applied in the usual way.

In some cases a cylindrical grinding wheel or milling cutter may be found suitable. It would be lowered by a guide on to the surface and then traversed about an eighth of an inch to provide a flat surface of this width. The guide should be of such shape that the prepared flat is correctly placed in relation to the indentor and to the miscroscope or other observing mechanism.

The preferred form of tool is a finger end mill. This is lowered as already mentioned and is then traversed to remove the centre plug of material and ensure a plane surface of sufficient area.

The invention is of especial advantage when combined with a testing machine constructed as described in the specification of my prior Patent 2,217,388, granted October 8, 1940. In the specific embodiment there described a hardness testing machine was provided with two anvils for supporting test specimens, and a swinging arm carried one set of indenting mechanism and two sets of optical apparatus each comprising a miscroscope and projection lens. Each microscope was adapted to cooperate with one of the anvils by swinging the arm to its limiting position in one or other direction, and in each case the indenting mechanism was in operative position over the other anvil.

When the present invention is applied to a machine of this construction the swinging arm is in the preferred construction given a third position midway between the extreme positions, and two milling cutters are mounted on the arm, each midway between one microscope and the indenting mechanism, for simultaneous operation. Of course the use of the cutters is then optional in the sense that with test specimens having of themselves a satisfactory finish for receiving the impression the operator will omit the milling and carry out the tests in sequence. With a batch of specimens requiring the preparation referred to, the first two are placed on the anvils with the arm in its central position, the milling cutters are operated simultaneously, the arm is moved to one limiting position, one specimen is indented, the arm is swung over and the second specimen is indented while the first is observed and replaced by the third, the arm is swung over again and the second specimen is observed and replaced by the fourth, and then the arm is brought to the central position for operation of the milling cutters on the third and fourth specimens, the same cycle of operations being repeated until the batch is cleared.

The accompanying drawings illustrate the invention as applied to a machine of the kind last referred to, and therein Figure 1 is a side elevation partly in section of the relevant parts of a hardness testing machine, Figure 2 is a front elevation of the same, Figure 3 is a diagrammatic plan on a smaller scale, and Figure 4 is a plan view of a detail.

Referring to the drawings, and more particularly Figures 1 and 2, some parts of the hardness testing machine already referred to will be recognised under the references used in my prior specification. The swinging support or arm 10 is journalled at 11 on the base 1 and carries the indenting lever 13 pivoted at 14 with balance weight 15 being guided in its movements by the flange 12. Other parts shown are the two anvils 2 and 3, the indentor 17, the microscopes 20 and 21 and the projection screen 23.

For preparing the surfaces on the specimens two plungers 37 and 38 are mounted to slide vertically near the outer end of the arm 10 and when the latter is in its central position are directly above the anvils 2 and 3 respectively.

Each plunger is terminated at the bottom by a finger end mill 39 held in a chuck on which a cord pulley 40 is mounted. The chuck with the pulley is rotatable freely in the plunger as in known forms of tools for like purposes.

A finger end mill is a milling cutter adapted to rotate in the manner of a drill. It has an end cutting edge located entirely on one side of the axis of rotation terminating short of that axis. Such a cutter is frequently used on engraving machines. When in operation an annular cutting action takes place and the central portion of the annulus is machined only by the horizontal sweeping action of the tool holder, the vertical wall of the recess being cut by a vertical cutting edge terminating at the outer extremity of the face cutting edge. The object of using a cutter of this kind is to obviate the effect of the center of a flat rotary cutter which would tend to penetrate rather than cut the surface and thus affect the hardness of the machined surface.

The end mills are driven together by means of a single cord 41 from a motor 42 mounted on the arm 10 above its pivot 11. The motor 42 has a cord pulley 43 keyed to its shaft, and the cord is taken over guide pulleys 44 and 45. Each plunger has a groove 46 at its lower end to engage a double fork 47 shown in greater detail in Figure 4. Pairs of pins projecting inwards from the outer ends of the fork into the grooves 46 serve to raise and lower the plungers as the fork is moved.

The fork 47 is pivoted on a lug 48 attached to the under side of the arm 10. Springs 49 normally hold the fork and plungers in their upper position. An eccentric cam 50 mounted on the under side of the arm 10 bears on a cross bar 51 forming a part of the fork 47, and as the cam is rotated the plungers are brought down, so that the end mills 39 driven by the motor 42 cut the required surfaces on the specimens on the anvils. The downward movement of the fork is limited by the point of an adjustable screw 52 carried by a part 52ª fixed with respect to the arm 10, and, when the fork is brought into this position, the arm is traversed a small distance.

Figure 3 is a diagrammatic plan showing the relative positions of the parts while the surfaces are being prepared on the test specimens as above described.

What I claim is:

1. A hardness testing machine comprising in combination an anvil for a specimen to be tested, a support, an indentor with operating means on said support, means on said support for measuring the impression produced by the indentor on said specimen, means on said support for preparing a clean flat surface on the specimen, and means mounting said anvil and support for relative movement for bringing any one of the three said means on said support selectively into cooperative relation with a predetermined portion of said specimen while on said anvil.

2. A hardness testing machine comprising in combination an anvil for supporting a specimen to be tested, a support, an indentor with operating means on said support, means on said support for measuring the impression produced by the indentor on said specimen, a finger end mill on said support for preparing a surface on the specimen to receive indenting impression, driving and feeding means on said support for said finger end mill, and means mounting said anvil and support for relative movement for bringing the indentor, the measuring means, or the finger end mill selectively into operative relation to a predetermined portion of said specimen while on said anvil.

3. A hardness testing machine comprising in combination two spaced anvils for supporting separate specimens to be tested, a support, an indentor with operating means on said support, means on said support for measuring the impression produced by the indentor on said specimens, two separate apparatus on said support for preparing a clean flat surface on said specimens respectively, and means mounting said anvil and support for relative movement for bringing said apparatus into cooperative relation with predetermined portions of said specimens respectively and to bring said indentor and said measuring means into cooperative relation to said specimen portions.

4. A hardness testing machine as set forth in claim 3 including driving means common to the two sets of surface preparing apparatus.

5. A hardness testing machine comprising an anvil for supporting specimens, a swinging arm, an indentor on the arm, a microscope on the arm, apparatus on the arm for preparing a clean flat surface on a specimen positioned on said anvil, and means mounting said arm to move to bring the surface-preparing apparatus, the indentor, and the microscope selectively into operative relation to a portion of a specimen on said anvil.

6. A hardness testing machine comprising two anvils for receiving specimens, a swinging arm movable over the anvils, an indentor located on the arm to cooperate with either anvil, two microscopes on the arm each located to cooperate with one anvil when the indentor is in position to cooperate with the other, two finger end mills mounted on the arm between the indentor and the respective microscopes and spaced apart to cooperate simultaneously with the two anvils when the arm is between its extreme positions.

7. A hardness testing machine as claimed in claim 6 comprising also a double fork pivoted on the swinging arm and provided with fingers to engage grooves on the finger end mills, an eccentric cam to engage the fork and feed the mills downwards, a spring to urge the fork upwards against the cam, and an adjustable stop to limit the downward movement of the fork.

ROBERT LOW HERON SMITH.